United States Patent [19]
Saitoh et al.

[11] Patent Number: 4,902,587
[45] Date of Patent: Feb. 20, 1990

[54] FUEL CELL

[75] Inventors: Toshihiro Saitoh, Hitachi; Keizou Ohtsuka, Katsuta; Shuhei Yamaguchi, Hitachi; Toshiki Kahara, Ibaraki, all of Japan

[73] Assignee: Hitachi, Ltd., Tokyo, Japan

[21] Appl. No.: 295,905

[22] Filed: Jan. 11, 1989

[30] Foreign Application Priority Data

Jan. 14, 1988 [JP] Japan .................................. 63-4726

[51] Int. Cl.$^4$ ........................ H01M 4/86; H01M 8/14
[52] U.S. Cl. ..................................... 429/45; 429/16; 429/34
[58] Field of Search ..................... 429/45, 218, 44, 40, 429/34, 16, 101, 103; 427/115; 29/623.1, 623.5; 419/29; 420/442, 441

[56] References Cited
U.S. PATENT DOCUMENTS

| 3,268,365 | 8/1966 | McQuade et al. | 429/16 |
| 4,247,604 | 1/1981 | Marianowski et al. | 429/40 |
| 4,480,017 | 10/1984 | Takeuchi et al. | 429/38 |
| 4,554,225 | 11/1985 | Sounai et al. | 429/16 X |
| 4,643,955 | 2/1987 | Smith et al. | 429/45 X |
| 4,752,500 | 6/1988 | Donado | 429/45 X |

Primary Examiner—Anthony Skapars
Attorney, Agent, or Firm—Antonelli, Terry & Wands

[57] ABSTRACT

The present invention provides a fuel cell which is improved in creep resistance and sintering resistance of anode and in activity of anode and which can maintain high performance over a long time. This fuel cell comprises a laminate comprising an electrolyte holding material having pores for holding an electrolyte, an anode and a cathode which sandwich the electrolyte holding material and a separator provided with grooves for feeding a gas to the anode and cathode characterized in that the anode is a ternary anode which comprises nickel as a main component and additionally cobalt and chromium oxide.

8 Claims, 2 Drawing Sheets

FUEL CELL

BACKGROUND OF THE INVENTION

The present invention relates to a molten carbonate type fuel cell and more particularly it relates to an anode suitable to provide a fuel cell of high performance and long life.

It is most important for constructing a molten carbonate type fuel cell to choose highly corrosion resistant materials because this cell is very high in operating temperature, namely, about 650° C. and besides contains a molten carbonate which is highest in corrosiveness. Especially, electrodes directly contact the molten carbonate and thus are placed under extremely severe conditions. Therefore, the anode may undergo considerable corrosion and especially important task is selection of materials for the anode which can stand operation of a long period.

Anode of conventional art comprises sintered nickel or a binary metal mainly composed of nickel. However, the binary metal suffers from the problems that addition of another metal, considering creep resistance and sintering resistance, may prolong the cell life, but may cause decrease of performance of cell and addition of another metal aiming at improvement of performance may improve performance, but cannot prolong the cell life. As related techniques, mention may be made of those disclosed in Japanese Patent Kokai Nos. 62-88272, 55-141071 and 57-25673.

The above conventional techniques have attached importance to only either one of prolongation of cell life or improvement of performance and have not been able to provide a cell of high performance and besides capable of being operated for a long time.

SUMMARY OF THE INVENTION

The object of the present invention is to provide a fuel cell higher in performance and longer in life than fuel cells having an anode of sintered nickel alone or a binary metal comprising nickel and other metal.

DESCRIPTION OF THE INVENTION

In order to attain high performance and long life of a molten carbonate fuel type cell, the present invention has aimed at high activation of anode as well as improvement of creep resistance and sintering resistance. For this purpose, a second substance and a third substance have been added in order to improve sintering resistance and creep resistance of nickel which is the main component of anode and in order to increase activity and improve performance, respectively. According to the present invention, it has been found that chromium oxide is suitable as the second substance and cobalt is suitable as the third substance. As the chromium oxide used in the present invention chromium (III) oxide ($Cr_2O_3$) is preferred. Hereinafter the "chromium oxide" means $Cr_2O_3$.

Figure 3:
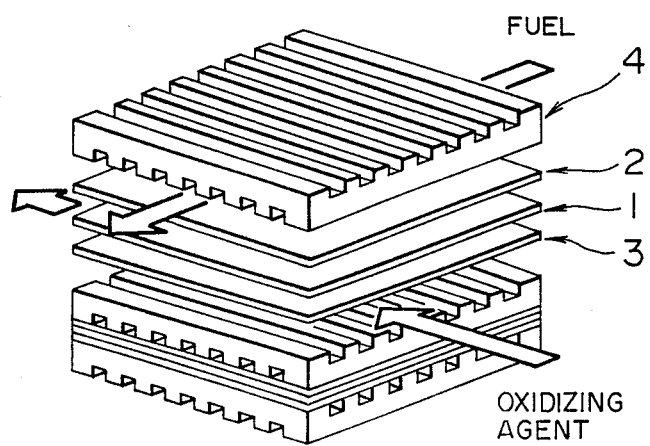
FIG. 3 is a schematical view of a fuel cell used in the present invention.

An example of the fuel cells used in the present invention has a structure as shown in FIG. 3. Such a cell comprises electrolyte plate 1 comprising an electrolyte holder impregnated with an electrolyte, anode 2 and cathode 3 between which is put the electrolyte plate 1, and separators 4 having channels provided thereon for allowing fuel and oxidizing agent gases to flow therethrough.

The above object of the present invention has been attained by using an anode prepared by one of the following methods.

(1) Nickel powder as a main component is mixed with chromium oxide and cobalt powder and the mixture is sintered.

(2) Nickel powder is mixed with chromium oxide, the mixture is sintered, the sintered mixture is impregnated with cobalt and thus cobalt-impregnated product is further subjected to heat treatment.

(3) Nickel powder is mixed with cobalt powder, the mixture is sintered, the sintered mixture is impregnated with chromium and then only the chromium is selectively oxidized.

(4) A nickel sintered body is impregnated with cobalt and chromium and then heated and thereafter, only the chromium is selectively oxidized.

(5) Nickel, chromium and cobalt powders are mixed together and sintered, and only the chromium is selectively oxidized.

Addition amount of chromium oxide is suitably 3–20 atom % (based on nickel) in terms of metallic chromium. When less than 3 atom %, creep resistance and sintering resistance of anode are deteriorated. When more than 20 atom %, there occur the problems that resistivity of anode increases to cause considerable reduction of performance and besides mechanical strength of anode is reduced. Thus, 3–20 atom % is suitable in order to improve creep resistance and sintering resistance of anode and to prevent increase of resistivity and reduction of mechanical strength.

Similarly, it has been found that addition amount of cobalt is suitably 3–20 atom % based on nickel. When addition amount of cobalt is less than 3 atom %, activity of anode is similar to that of anode comprising only nickel and improvement of cell performance cannot be recognized. When more than 20 atom %, reduction of cell performance is seen. The cause is not clear, but it is considered that when addition amount is too much, the activity is lowered due to some action between nickel and cobalt. It is generally tried to add a second element for enhancing catalyst activity and it is also known in such case that there is a suitable range in the amount of the second element added. It is considered that the same reason can be applied to the cobalt added in the present invention.

Figure 1:
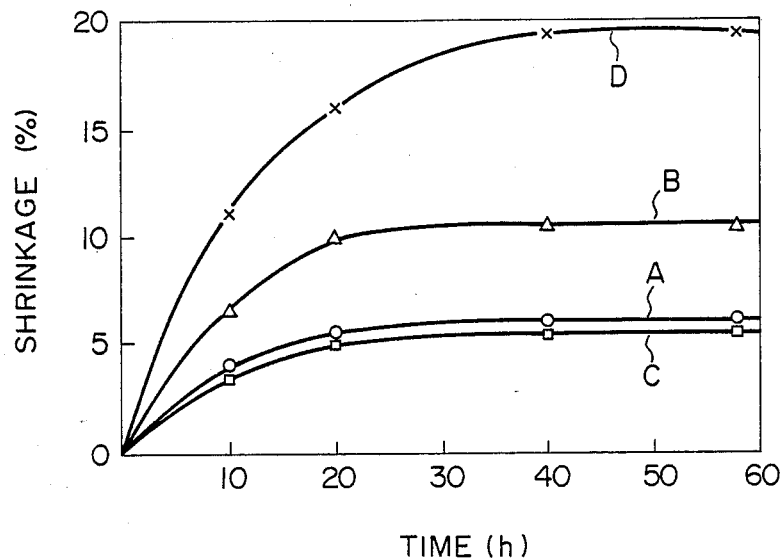
FIG. 1 is a graph which shows change in thickness of the anode of the present invention and a conventional anode.
Figure 2:
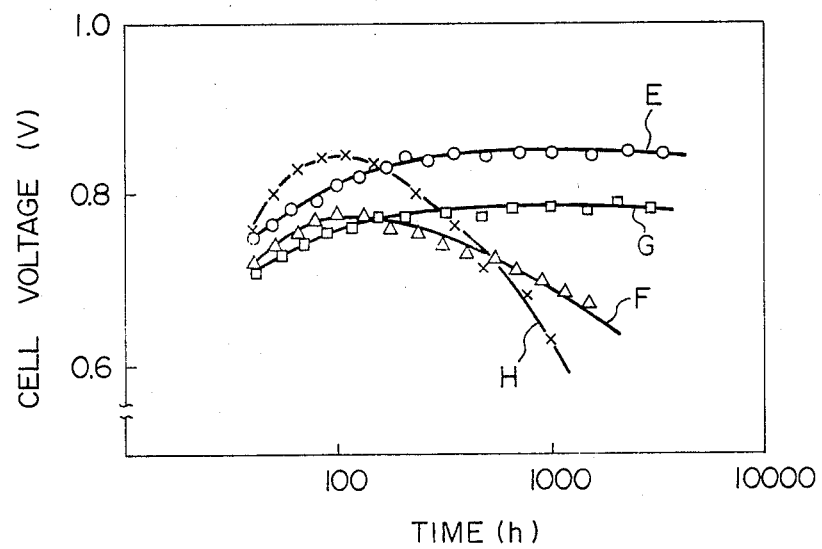
FIG. 2 is a graph which compares performance of a cell using an anode of the present invention and that of a cell using a conventional anode.

FIG. 1 shows the results of examination on change of the anode of the present invention and conventional ones with lapse of time. The curve A in FIG. 1 shows the results on the anode of the present invention which contains cobalt and chromium oxide in an amount of 5 atom % and 7 atom % (in terms of metallic chromium) based on nickel, respectively. The curve B shows the results on a conventional anode which comprises only nickel. The curve C shows the results on an anode for comparison which contains only chromium oxide in the same amount as in the anode of the present invention in addition to nickel. The curve D shows the results on an anode for comparison which contains only cobalt in an amount of 5 atom % in addition to nickel. This test was carried out by applying a surface pressure of 2 kg/cm$^2$ to the anode in an inert atmosphere of 650° C. using a thermocompression test machine and change of thickness with time was examined. That is, it can be said that an anode less in change is higher in creep resistance and sintering resistance. From the results of FIG. 1, it can be said that the anode of the present invention is equivalent to the anode containing only chromium oxide in creep resistance and sintering resistance. However, as shown in FIG. 2 referred to hereinafter, according to the present invention, cell performance can be markedly improved by addition of cobalt as compared with when only chromium oxide is added as in the conventional technique.

The present invention will be further explained by the following examples.

EXAMPLE 1

62.5 g of carboxymethyl cellulose was added to 2.5 liters of distilled water and the mixture was kneaded and deaerated to obtain a binder solution. To this binder solution were added 2.5 kg of a nickel powder of about 3 μm in average particle size and 360 g of a chromium oxide powder of about 3 μm in average particle size, followed by further kneading and deaeration to obtain a slurry. A wire gauze of 40 meshes was passed through this slurry solution to deposit the slurry thereon and then this wire gauze was passed through a slit to adjust the thickness of the resulting electrode and dried. Thereafter, the electrode was sintered at 850° C. in a hydrogen atmosphere to obtain a nickel-chromium oxide porous sintered body. Then, an aqueous cobalt nitrate solution was prepared which was adjusted so that the amount of cobalt based on nickel was 5 atom %. The above nickel-chromium oxide porous sintered body was dipped in this aqueous cobalt nitrate solution for 15 minutes and then, was taken out, followed by removing an excess solution and drying. This was sintered at 700° C. in a hydrogen atmosphere to obtain a nickel-chromium oxide-cobalt ternary anode.

In FIG. 2, performance of a cell which had the anode of the present invention is shown by curve E and the performance of a cell which had a conventional anode of nickel alone is shown by curve F for comparison. For further comparison, performances of cells which had an anode which was prepared in the same manner as above except that each of chromium oxide and cobalt was used singly in the same amount as above and not in combination are shown by curves G and H. The performance of the cell was determined by operating the cell by feeding 70% of air and 30% of carbon dioxide as an oxidizing agent and a mixed gas of 80% hydrogen and 20% carbon dioxide as a fuel at an electrode area of 900 cm$^2$ and a cell temperature of 650° C. In this case, a cathode comprising nickel oxide prepared by a known method was used and an electrolyte plate prepared by a known method, namely, by impregnating a sheet comprising a lithium aluminate fine powder with a mixture comprising 38 mol % of potassium carbonate and 62 mol % of lithium carbonate was used. As is clear from FIG. 2, the cell which had the anode of the present invention maintained high performance as compared with other cells even after lapse of a long time.

EXAMPLE 2

62.5 g of carboxymethyl cellulose was added to 2.5 liters of distilled water and the mixture was kneaded and deaerated to obtain a binder solution. To this binder solution was added 2.5 kg of nickel powder of about 3 μm in average particle size and the mixture was further kneaded and deaerated to obtain a slurry. A wire gauze of 40 meshes was passed through this slurry solution to deposit the slurry thereon and then this wire gauze was passed through a slit to adjust thickness and dried. Thereafter, the wire gauze was sintered at 850° C. in a hydrogen atmosphere to obtain a nickel porous sintered body. Then, an aqueous cobalt nitrate solution was prepared so that addition amount of cobalt based on nickel was 5 atom %. The above nickel porous sintered body was dipped in this aqueous cobalt nitrate solution for 15 minutes and then, was taken out, followed by removing an excess solution and drying. This was sintered at 700° C. in a hydrogen atmosphere to obtain a nickel-cobalt porous sintered body. Another aqueous chromium nitrate solution was prepared so that addition amount of chromium based on nickel was 7 atom %. The above nickel-cobalt porous sintered body was dipped in this aqueous chromium nitrate solution for 15 minutes. Then, this was taken out, followed by removing an excess solution and drying. Thereafter, this was heated at 470° C. in an air atmosphere to oxidize chromium and then was further heated to 700° C. in a hydrogen atmosphere to obtain a nickel-cobalt-chromium oxide ternary anode. Performance of a cell which had the anode obtained in this Example is shown by curve E in FIG. 2. The results were similar to those for the cell where the anode obtained in Example 1 was used.

EXAMPLE 3

62.5 g of carboxymethyl cellulose was added to 2.5 liters of distilled water to prepare a binder solution. Then, to this solution were added 2.5 kg of a nickel powder of about 3 μm in average particle size, 360 g of a chromium oxide powder of about 3 μm in average particle size and 120 g of a cobalt oxide of about 3 μm in average particle size, followed by kneading and deaeration to obtain a slurry. A wire gauze of 40 meshes was passed through this slurry to deposit the slurry on the gauze, and the gauze was passed through a slit to adjust the thickness of the resulting electrode and dried. Thereafter, the electrode was sintered at 850° C. in a hydrogen atmosphere to obtain a porous plate. This porous plate was used as an anode in a cell. This cell was reduced by about 30 mV in voltage as compared with the cell indicated with curve E in FIG. 2, but there was a little change with time in voltage. Thus, the cell of this example was excellent.

. EXAMPLE 4

62.5 g of carboxymethyl cellulose was added to 2.5 liters of distilled water to prepare a binder solution. Then, to this solution were added 2.5 kg of a nickel powder of about 3 μm in average particle size, the resulting mixture was kneaded and deaerated to form a slurry. A wire gauze of 40 meshes was passed through the slurry to deposit the slurry on the gauze. The deposited gauze as electrode was passed through a slit to adjust the thickness of the electrode and then dried. Thereafter, the deposited gauze was sintered at 850° C. in a hydrogen atmosphere to obtain a porous nickel plate. An aqueous mix solution of cobalt nitrate and chromium nitrate was prepared so that the amounts of cobalt and chromium added were 5 atom % and 7 atom % based on nickel, respectively. In this mix solution was dipped the porous nickel plate for 15 minutes. The plate was dried and fired at 700° C. in a hydrogen atmosphere to decompose the nitrates, thereby producing a nickel-cobalt alloy. Then, the plate was heated in air to 450° C. for 5 hours to convert the chromium to chromium oxide. At this stage, part of the nickel was oxidized in nickel oxide. Therefore, the plate was again heated in a hydrogen atmosphere at 700° C. This treatment allowed the nickel oxide to be reduced in nickel, but the chromium oxide remained as it was. Therefore, a nickel-cobalt-chromium chromium oxide anode was obtained. The performance of a cell using this anode was almost equal to that indicated with curve E in FIG. 2.

EXAMPLE 5

Example 3 was repeated, except that 150 g of a chromium powder of about 2 μm in average particle size was used instead of the chromium oxide as shown in Example 3, thereby producing a porous nickel-cobalt-chromium sintered plate. Then, this porous sintered plate heated in air at 450° C. for 5 hours, thereby oxidizing the chromium in chromium oxide. Then, since part of the nickel was oxidized in nickel oxide, further heating in a hydrogen atmosphere at 700° C. was effected. This treatment allowed the nickel oxide to be reduced in nickel, but the chromium oxide remained as it was, thereby producing a nickel-cobalt-chromium oxide anode. The performance of a cell using this anode was almost equal to that of the cell according to Example 3.

As is clear from the above, according to the present invention, a molten carbonate type fuel cell which is improved in creep resistance, sintering resistance and activity of anode and can maintain high performance over a long time can be obtained by using a ternary anode mainly composed of nickel to which cobalt and chromium oxide are added in combination.

What is claimed is:

1. A fuel cell which comprises a laminate comprising an electrolyte holding material having pores for holding an electrolyte, an anode and a cathode provided to sandwich said electrolyte holding material and a separator provided with grooves for feeding a gas to said anode and cathode wherein said anode is a ternary anode which comprises nickel as a main component and additionally cobalt and chromium oxide.

2. A fuel cell according to claim 1 wherein the amount of cobalt is 3-20 atom % based on nickel.

3. A fuel cell according to claim 1 wherein the amount of chromium oxide is 3-20 atom % in terms of metallic chromium based on nickel.

4. A fuel cell according to claim 1 wherein the ternary anode is prepared by mixing nickel, chromium oxide and cobalt powders and heating and sintering the mixture.

5. A fuel cell according to claim 1 wherein the ternary anode is prepared by mixing nickel and chromium oxide powders, sintering the mixture, impregnating the sintered mixture with cobalt and then heating the impregnated sintered mixture.

6. A fuel cell according to claim 1 wherein the ternary anode is prepared by mixing nickel and cobalt powders, sintering the mixture, then impregnating the sintered mixture with chromium and selectively oxidizing only the chromium.

7. A fuel cell according to claim 1 wherein the ternary anode is prepared by firstly sintering a nickel powder, impregnating the sintered nickel powder with cobalt and chromium, heating the impregnated sintered nickel powder and selectively oxidizing only the chromium.

8. A fuel cell according to claim 1 wherein the ternary anode is prepared by mixing nickel, chromium and cobalt powders, sintering the mixture and selectively oxidizing only the chromium.

* * * * *